(12) United States Patent
Murakami

(10) Patent No.: US 6,462,733 B1
(45) Date of Patent: *Oct. 8, 2002

(54) DIGITIZER, ASSISTING APPARATUS FOR DIGITIZER, AND DIGITIZER SYSTEM

(75) Inventor: Azuma Murakami, Saitama-ken (JP)

(73) Assignee: Wacom Co., Ltd., Saitama-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/644,403

(22) Filed: May 10, 1996

(30) Foreign Application Priority Data

May 15, 1995 (JP) ............................................. 7-116012

(51) Int. Cl.⁷ ................................................. G09G 5/00
(52) U.S. Cl. ........................ 345/173; 345/156; 345/184
(58) Field of Search ................................ 345/173, 174, 345/175, 176, 177, 178, 184; 178/18, 19

(56) References Cited

U.S. PATENT DOCUMENTS

| | | | | |
|---|---|---|---|---|
| 4,631,525 A | * | 12/1986 | Serravalle, Jr. | 345/173 |
| 4,947,156 A | | 8/1990 | Sata et al. | |
| 5,311,207 A | * | 5/1994 | Kusumoto et al. | 345/173 |
| 5,604,517 A | * | 2/1997 | Filo | 345/173 |

FOREIGN PATENT DOCUMENTS

| | | |
|---|---|---|
| DE | 3540626 A1 | 5/1986 |
| JP | 27329 | 2/1982 |
| JP | 86443 | 9/1991 |
| JP | 328623 | 11/1992 |
| JP | 6230878 | 8/1994 |
| JP | 06242877 | 9/1994 |
| WO | WO9103783 | 3/1991 |

OTHER PUBLICATIONS

Dabbler, User Manural for Macintosh and Windows, Fractal Design Corporation, p. 15.

* cited by examiner

Primary Examiner—Matthew Luu
(74) Attorney, Agent, or Firm—Tarolli, Sundheim, Covell, Tummino & Szabo L.L.P.

(57) ABSTRACT

A system comprises a digitizer which includes a position indicator and a coordinate detecting device in the form of a tablet and has a selection/indication area within its coordinate detecting surface to select/indicate data processing functions, a display device, and a computer which controls the digitizer and the display device, wherein the data processing functions are selected/indicated by using the position indicator to perform an image processing. In the system, the coordinate detecting device comprises an indication part which is located within the selection/indication area of the coordinate detecting surface of the coordinate detecting device and makes it possible the status of selections/indications of the data processing functions to be visually observed. The indication part comprises an engaging means which temporarily engages with the position indicator and is movable together with the engaged position indicator, an indicator means, which is movable with the engaging means which is temporarily engaged with the position indicator, to visually indicate a selected/indicated data processing function, and a supporting means to engage and support the indicator means.

23 Claims, 13 Drawing Sheets

DIGITIZER, ASSISTING APPARATUS FOR DIGITIZER, AND DIGITIZER SYSTEM

BACKGROUND OF THE INVENTION

1. Field of the Invention

The present invention relates to an apparatus which is used with a computer system which comprises a position indicator and a coordinate detecting device which detects a coordinate indicated by the position indicator. Especially, the present invention relates to an apparatus which mechanically and physically indicates on a tablet indications of menus, switches, etc., which are displayed on a screen of a display device when software or a program is operated in a computer system.

2. Prior Art

Conventionally, in a computer system which has a CAD system, a graphic user interface (GUI), etc., selection and operation switches of software functions, such as operation modes and tools, are displayed as icons on a screen of a display device. The icons are in the forms of a button, a sliding bar, etc., and they are displayed on a part of the screen. A user uses an input device such as a digitizer and a mouse to move a cursor onto an icon which indicates a desired function, then executes a click operation whereby the desired function is selected.

FIG. 1 shows an example of a conventional computer system which utilizes a digitizer which comprises a tablet and a pen-shaped position indicator. In the FIG. 1 denotes a display device, 2 a display screen, 3 a computer, 4 a tablet of a digitizer, 5 a frame part of tablet 4, 6 a coordinate position detecting surface, 7 a position indicator, and 7a a tip of the position indicator 7.

In FIG. 1, an example of a display, when an application program for drawing is used, is shown in the screen 2.

The left side of the screen 2 is an area for indicating functions, or a function display area 8. In this function display area 8, a mode menu display 9, a color menu display 10 and a line menu display 11 are displayed. Each menu display is comprised of a plurality of icons, each icon representing a function in a menu. On the left side of menus, triangle-shaped marks 12, 13 and 14 which indicate currently selected functions are displayed.

The mode menu display 9 includes icons which indicate a tool for drawing a straight line, a tool for drawing a rectangular, a tool for drawing a circle, a tool for drawing a free line, and a tool for erasing a drawn line. The color menu display 10 includes icons which indicate a plurality of selectable colors, such as black, white, red, orange, yellow, green, blue and purple, form the top. The line menu display 11 includes icons which indicate a plurality of selectable kinds of lines such as a very fine line, a fine line, a thick line and a very thick line, from the top. The area other than the function display area 8 of the screen 2 is an area for display and drawing, that is, a display and drawing area 15. The display and drawing area 15 is an area which a user can freely utilize. In the area 15, a pen-shaped cursor 16 and a drawn line are shown. The shape of the cursor 16 changes in accordance with a selected function. For example, when the tool for drawing a free line is selected, a pen-shaped cursor appears, and when the tool for erasing a drawn line is selected, an eraser-shaped cursor appears.

Area 17, 18 and 19 of left side of the detecting surface 6 of the tablet 4, which are delineated by dotted lines, correspond to the menu displays 9, 10 and 11 of function the display area 8 of the screen 2, respectively. The dotted lines are indicated only for the purpose of explanation, and are not drawn on the actual detecting surface 6.

FIG. 2 shows a main part of the tablet 4 and the computer 3. The tablet 4 includes a plurality of antennas 20, a control part 21 and a coordinate value storage 22.

The antennas 20 are placed beneath the detecting surface 6, and they receive a signal outputted from the position indicator 7. The control part 21 has a function of converting a signal received by the antennas 20 into a signal representing a X-Y coordinate value of X-Y coordinate system of the tablet 4, and a function of generating a control signal corresponding to each X-Y coordinate value. The coordinate value storage 22 stores data which indicate corresponding relations between functions/processes to be executed and coordinate values.

Next, an operation of the application program for drawing will be explained. In this example, it is supposed that the functions of "tool for drawing a free line," "red," and "fine line" will be selected.

When the application program is started, the function display area 8 including the menu displays 9, 10 and 11, and the display and drawing area 15 are displayed on the screen 2.

A user moves the cursor 16, which is displayed on the screen 2, onto an icon which indicates the desired function. The cursor 16 is moved by contacting or closely placing the tip 7a of the position indicator 7 to the detecting surface 6 of the tablet 4 and moving it.

The user moves the cursor 16 to the icon indicating the "tool for drawing a free line" of the mode menu display 9. That is, the user indicates, by contacting or closely placing the tip 7a of the position indicator 7, the position in the area 17 of the detecting surface 6 which corresponds to the position of the icon of "tool for drawing a free line". Then, the user moves the position indicator 7 away, or lifts it from the detecting surface 6.

The tablet 4 serially receives signals sent from the position indicator 7 by the antennas 20 which are placed under the position that the position indicator 7 points to. The received signals are inputted to the control part 21. Based on the received signals, the control part 21 serially calculates coordinate values (X,Y) of the points that the position indicator 7 has indicated, of the X-Y coordinate system of the tablet 4. The control part 21 stores the last calculated coordinate value, that is, the coordinate value just before the position indicator 7 separates from the detecting surface 6.

To determine which thing the last calculated coordinate value indicates, the control part 21 accesses the coordinate value storage 22 to read data corresponding to the last calculated coordinate value.

The data read from the coordinate value storage 22 indicates that the coordinate value corresponds to the tool for drawing a free line. Based on the extracted data, the control part 21 generates a signal to select the "tool for drawing a free line," and sends the signal to the computer 3.

The computer 3 receives the signal and switches the presently executing mode of the application program for drawing to mode of "tool for drawing a free line."

When the mode is selected, the triangular mark 12 is displayed on the left side of the icon indicating the "tool for drawing a free line," that is, the mark 12 is displayed on the left side of the forth icon of the mode menu display 9, to indicate that the function is presently selected.

In a similar manner, the user selects the third icon from icons of the color menu display 10 to select "red," and selects the second icon from icons of the line menu display 11 to select "fine line." The marks 13 and 14 are respectively displayed on the left sides of the selected icons.

After a setting for drawing is completed, that is, after a selection of a tool, a color and a line is completed, the user starts drawing a picture or a character on the display and drawing area 15. Since the "tool for drawing a free line" is selected, the pen-shaped cursor 16 is displayed in the display and drawing area 15. Also, since functions of "red" and "fine line" are selected, the drawn line is red and fine.

The user puts, at his desired position, the tip 7a of the position indicator 7 in contact (or put closely) with the detecting surface 6 of the tablet 4 and moves it. The cursor 16 moves in correspondence with the movement of the position indicator 7, and a line is drawn on the screen 2 along a trace of movement of the cursor 16.

Another example of a display of a software function is the display of a scroll bar.

In a conventional system, only a part of an image is displayed when a whole of the image cannot be displayed on a display screen. When it is desired to display another part of the image, for example, a part of the right side of the currently displayed part of the image, a scroll process is executed to move the currently displayed part to the left of the screen. For example, when performing a transverse direction scrolling, for example, when it is desired to see the right side part of an image, a user places a cursor on a button of the transverse direction scroll bar which is indicated at the bottom of the screen, and moves the cursor. Then, the button, as indicated, is moved along with the cursor, and the image moves relatively and proportionally in accordance with a distance of the movement of the cursor.

Usually, such a scroll bar is displayed on the bottom or side within a screen of a display device, for example.

Another example of a display in a software function is the display of a switch for a virtual camera. The virtual camera is a software which displays on a display device an image as if the image is seen from the camera, wherein the supporting axis of the camera is fixedly positioned at a point and the camera can be rotated horizontally and vertically, and has a zoom mechanism (see FIG. 7).

With this software, switches such as those for selecting and controlling a horizontal rotation, for selecting and controlling a vertical rotation, and for selecting and controlling a zoom function are displayed on a screen.

Another example of a display on a screen is the display of functions of a system which can execute tilt and rotate processes of a three-dimensional image on a screen, wherein are included displays of switches such as for switching a mode to a mode of tilting and rotating a three-dimensional image and displays of values of tilted and rotated angles.

Another example of a display on a screen is the display of a switch to switch between two modes.

All of the above exemplified displays of functions occupy a predetermined area of a screen of a display device.

Also, as other examples to display menus and switches, there are systems such as a pull-down menu and a pop-up menu. These systems are adapted when it is difficult to display all of the functions of an application program on a screen at one time, due to the large amount of selectable functions.

In a pull-down menu system, an icon which is a switch to open and display a menu is displayed on a screen, for example. In a similar manner as the above examples, an user moves an indicator on a detecting surface of a tablet to move a cursor on a screen onto the icon, then removes the indicator from the detecting surface, thereby opening the menu. As a result, the menu which is comprised of a plurality of icons is displayed, for example, under the icon. At this time, a part of the screen is covered by the menu, therefore the covered part cannot be seen. When a pop-up menu system is used, an open menu is displayed on a desired location of a screen. The user selects a desired function from the menu opened, then closes the menu to remove the display of the menu from the screen.

SUMMARY OF THE INVENTION

In the system such as the one shown in FIG. 1, it is necessary to use a part of a display screen of a display device to display functions and tools in order to operate a software program. Also, in a system which has other displays for other functions, such as displays of scroll bars, switches of a virtual camera, switches for tilting and rotating a three-dimensional image and indications of tilted and rotated angles, etc., as exemplified above, these displays are displayed on a part of a display screen, namely, a part of a display screen has to be used for such displays.

Therefore, a display and drawing area, which is freely usable, on a screen of a display device becomes narrower.

Also, when using a pull-down menu system or a pop-up menu system, it is necessary to execute operational steps such as the opening of a menu and, after the selection of a function, the closing of said menu. In other words, to use the above system, it is necessary to perform additional operational steps. Further, since the displayed menu vanishes from the screen when the menu is closed, the present setting cannot be seen or checked.

An object of the invention is to provide an indication apparatus for a digitizer, which removes displays of functions, which are necessary to operate a software, from a display screen of a display device to widen a freely usable area of the display screen; which requires no additional operational step in a software program; and which makes it possible to easily check current settings.

In the present invention, in a system comprising a digitizer which includes a position indicator and a coordinate detecting device which is in the form of a tablet, has a coordinate detecting surface which is indicated by said position indicator, and has a selection/indication area within said coordinate detecting surface to select/indicate data processing functions; a display device which has a display screen to display an image; And a computer which controls said digitizer and said display device; wherein the data processing functions are selected/indicated by using said position indicator to perform an image processing; the system comprises:

an indication part which is located within said selection/indication area of said coordinate detecting surface of said coordinate detecting device and makes it possible the status of selections/indications of the data processing functions to be visually observed, and a control means which selects a desired data processing function based on a data inputted via said indication part and processes a data based on the selected data processing function, wherein said indication part comprises an engaging means which temporarily engages with said position indicator and is movable together with engaged said position indicator, an indicator means, which is movable with said engaging means which is temporarily engaged with said position indicator, to visually indicate a selected/indicated data processing function, and a supporting means to engage and support said indicator means.

Also, in the present invention, in a system comprising a digitizer which includes a position indicator which is in the form of a pen and a coordinate detecting device which is in the form of a tablet, has a coordinate detecting surface which is indicated by said position indicator, and has a selection/indication area within said coordinate detecting surface to select/indicate data processing functions, wherein a rotational angle and a tilting angle of said position indicator with respect to its indicating position of said coordinate detecting surface can be detected; a display device which has a display screen to display an image; and a computer which controls said digitizer and said display device; wherein the data processing functions are selected/indicated by using said position indicator to perform an image processing; the system comprises:

an indication part which is located within said selection/indication area of said coordinate detecting surface of said coordinate detecting device and makes it possible the status of selections/indications of the data processing functions to be visually observed, wherein said indication part comprises an indication means which is comprised of a part having a spherical surface and an engaging means, wherein said engaging means is in the form of a hole on said spherical surface and is a means into which said position indicator is inserted to engage said position indicator with said indication part wherein said hole is also a means to visually indicate a rotational angle and a tilting angle of said position indicator, and a supporting means which engages and supports said indication means in such a manner that said position indicator can be rotated and tilted to a desired position when said position indicator is inserted in said engaging means and that said supporting means maintains the same position of said indication means as that when said position indicator is pulled out from said engaging means; and a control means which executes data processing functions in accordance with a rotation angle data and a tilt angle data inputted in association with said indication means.

Also, in the present invention, in a coordinate detecting device used in a digitizer which includes a position indicator, wherein the coordinate detecting device is in the form of a tablet, the coordinate detecting device comprises an indication part which is positioned within a selection/indication area, to select/indicate a data processing function, of a coordinate detecting surface of said coordinate detecting device and makes it possible the status of selections/indications of the data processing functions to be visually observed, wherein said indication part includes an engaging means which temporarily engages with said position indicator and is movable together with engaged said position indicator, an indicator means, which is movable with said engaging means which is temporarily engaged with said position indicator, to visually indicate a selected/indicated data processing function, and a supporting means to engage and support said indicator means.

Also, in the present invention, in a coordinate detecting device, in the form of a tablet, of a digitizer, wherein said digitizer includes a position indicator in the form of a pen and can detect a rotational angle and a tilting angle of said position indicator with respect to its indicating position of a coordinate detecting surface of said coordinate detecting device, the coordinate detecting device comprises an indication part which is located within a selection/indication area of said coordinate detecting surface of said coordinate detecting device and makes it possible the status of selections/indications of data processing functions to be visually observed, wherein said indication part comprises an indication means which is comprised of a part having a spherical surface and has an engaging means, wherein said engaging means is in the form of a hole on said spherical surface and is a means into which said position indicator is inserted to engage said position indicator with said indication part, wherein said hole is also a means to visually indicate a rotational angle and a tilting angle of said position indicator, and a supporting means which engages and supports said indication means in such a manner that said position indicator can be rotated and tilted to a desired position when said position indicator is inserted in said engaging means and that said supporting means maintains the same position of said indication means as that when said position indicator is pulled out from said engaging means.

Also, in the present invention, in an assisting apparatus which is used with a digitizer and separately constructed from said digitizer, wherein said digitizer includes apposition indicator and a coordinate detecting device which is in the form of a tablet, has a coordinate detecting surface which is indicated by said position indicator, and has a selection/indication area within said coordinate detecting surface to select/indicate data processing functions, the assisting apparatus comprises an indication part which is constructed in such a manner that it is placed within and onto said selection/indication area of said coordinate detecting surface of said coordinate detecting device and makes it possible the status of selections/indications of data processing functions to be visually observed, wherein said indication part includes an engaging means which temporarily engages with said position indicator and is movable together with engaged said position indicator, an indicator means, which is movable with said engaging means which is temporarily engaged with said position indicator, to visually indicate a selected/indicated data processing function, and a supporting means to engage and support said indicator means.

Also, in the present invention, in an assisting apparatus which is used with a digitizer which includes a position indicator which is in the form of a pen and a coordinate detecting device which is in the form of a tablet, and which is separately constructed from said digitizer, wherein said digitizer can detect a rotational angle and a tilting angle of said position indicator with respect to its indicating position of a coordinate detecting surface of said coordinate detecting device, the assisting apparatus comprises an indication part which is constructed in such a manner that it is placed within and onto a selection/indication area of said coordinate detecting surface of said coordinate detecting device and makes it possible the status of selections/indications of data processing functions to be visually observed, wherein said indication part comprises an indication means which is comprised of a part having a spherical surface and has an engaging means, wherein said engaging means is in the form of a hole on said spherical surface and is a means into which said position indicator is inserted to engage said position indicator with said indication part, and said hole is also a means to visually indicate a rotational angle and a tilting angle of said position indicator, and a supporting means which engages and supports said indication means in such a manner that said position indicator can be rotated and tilted to a desired position when said position indicator is inserted in said engaging means and that said supporting means maintains the same position of said indication means as that when said position indicator is pulled out from said engaging means.

By adapting the above constructions, a freely usable area of a display screen becomes wider and it becomes possible to easily check current setting conditions, without any additional operational steps of a software program.

Also, by separately constructing the indication part, that is, by separately constructing an assisting apparatus, it becomes unnecessary to modify an existing tablet. Also, by constructing a corresponding assisting apparatus for each application program and by changing the assisting apparatus in accordance with a selected application program, the setting conditions of any application programs can be easily visually checked.

BRIEF DESCRIPTION OF THE DRAWINGS

FIGS. 5A, 5B and 5C show an example of a structure of indicator 35, 36 or 37 of indication part 29, 30 or 31 wherein FIG. 5A is a sectional view of groove 32, 33 or 34 and a main part of indicator 35, 36 or 37 of indication part 29, 30 or 31, FIG. 5B is a sectional view of indicator 35, 36 or 37 wherein tip 7a of position indicator 7 is inserted in hole 38, 39 or 40 of indicator 35, 36 or 37, and FIG. 5C is a plain view of FIG. 5A.

FIGS. 8A and 8B show an indicator of an indication part of a second shape wherein FIG. 8A is a perspective view of indicator 75 of indication part 74 and FIG. 8B is a plain view of indicator 75 of indication part 74.

FIGS. 10A, 10B and 10C show an example of an indication part which is suitable to use with a system which comprises a digitizer able to detect a tilting angle and a rotation angle of position indicator 7 and uses a program to tilt and rotate an image, wherein FIG. 10A is a perspective view of the indication part, FIG. 10B shows a setting in which position indicator 7 is inserted in an indicator of the indication part, and FIG. 10C is a plain view of the indication part.

FIGS. 11A and 11B show another shape of an indication part, wherein FIG. 11A is a perspective view of an indicator of an indication part and FIG. 11B is a sectional view of the indication part.

DETAILED DESCRIPTION OF PREFERRED EMBODIMENTS

Figure 2:
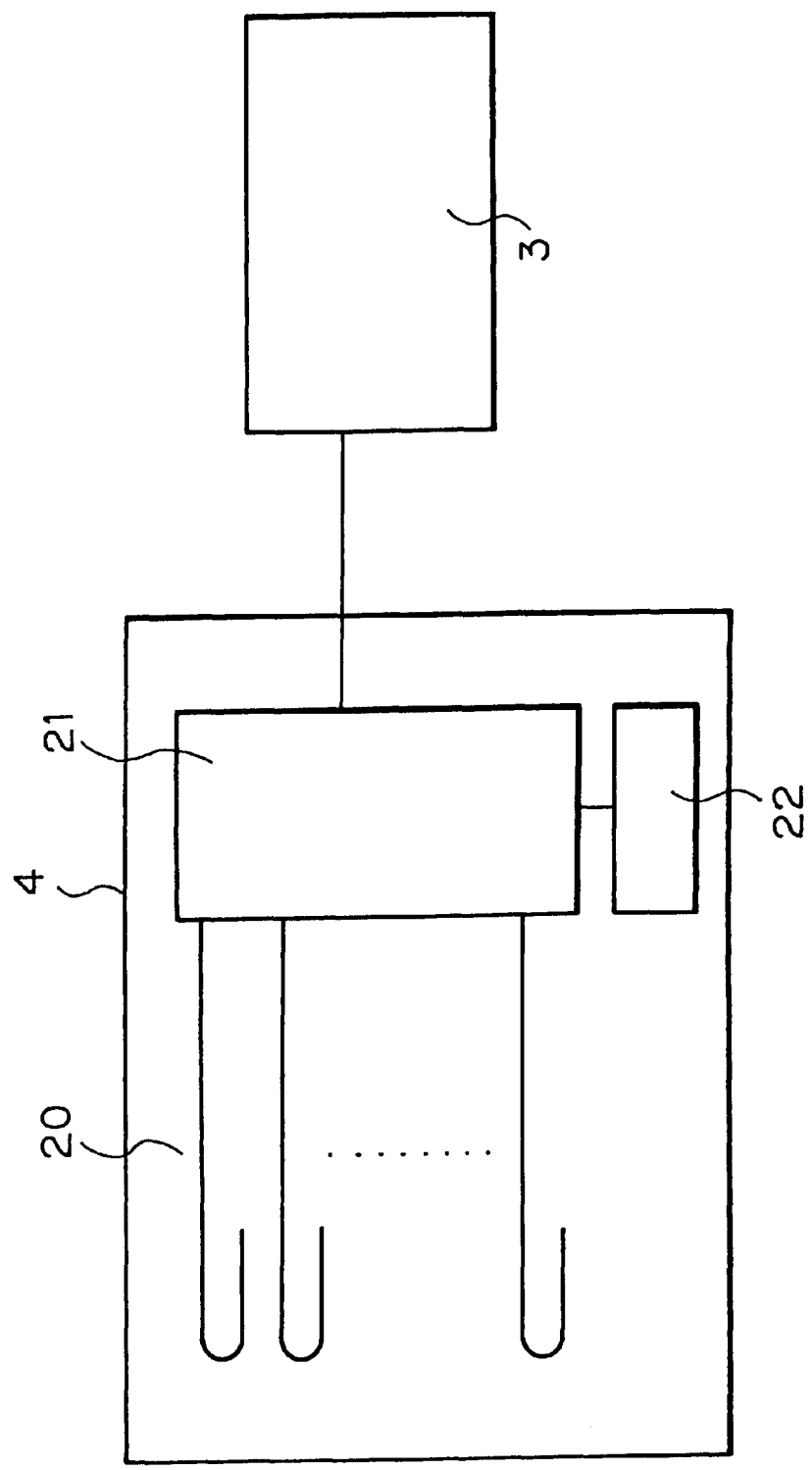
FIG. 2 shows a main part of tablet 4 and computer 3.
Figure 3:
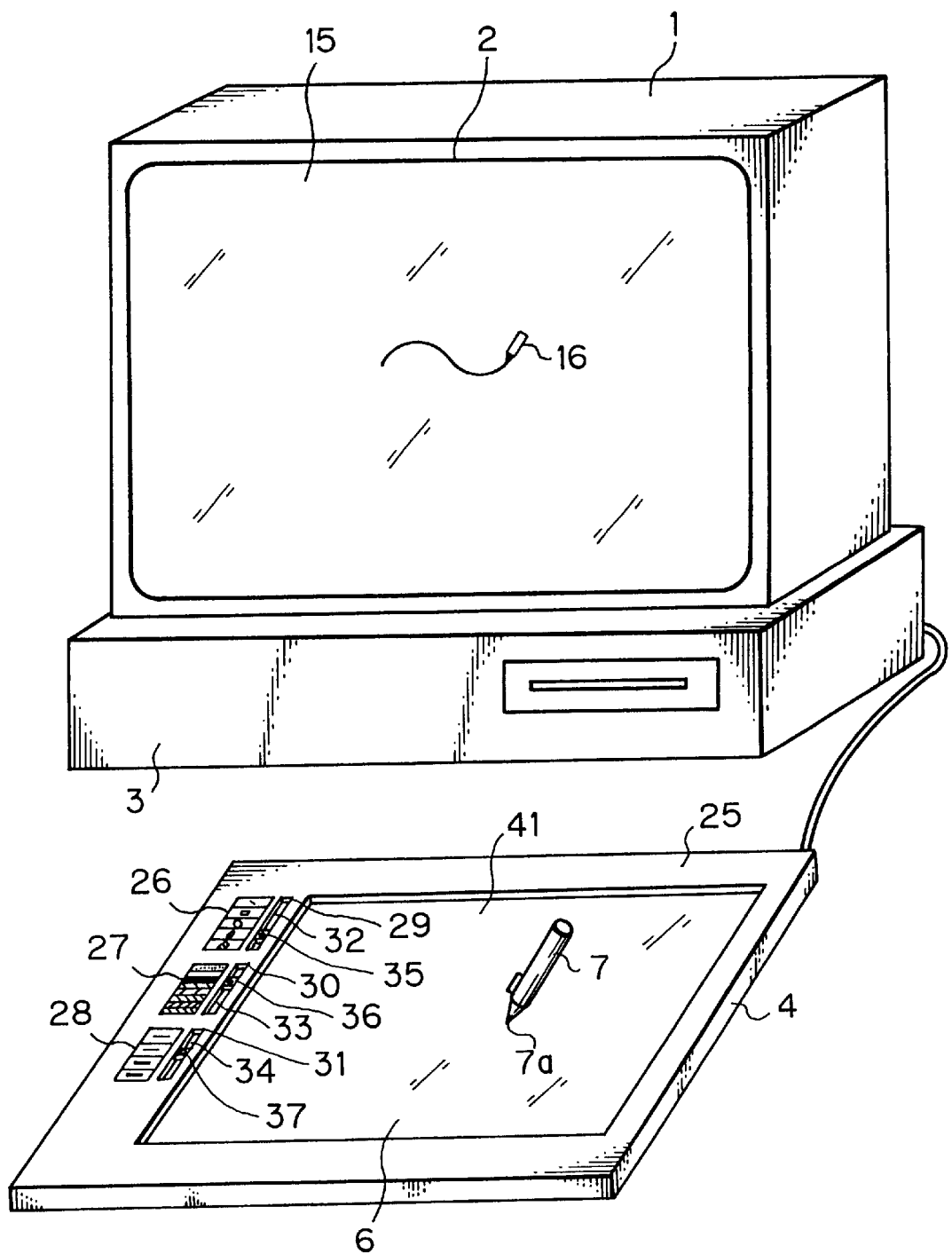
FIG. 3 shows an embodiment of an indication device of the present invention.

1. An Embodiment Incorporating an Indication Part of a First Shape:

FIG. 3 shows an embodiment of an indication device of the present invention. In FIG. 3, the reference numbers which are same as those of FIG. 1 refer to the same elements as those of FIG. 1. Also, the constructions of the tablet and the computer are the same as those of FIGS. 1 and 2.

In this embodiment, the indication device is integratedly formed with a frame part 25 of a tablet 4, on the left side part of the frame part 25. In the left side part of the frame part 25, a mode menu display part 26 indicating a mode menu, a color menu display part 27 indicating a color menu, and a line menu display part 28 indicating a line menu are provided. Indications of these display parts 26, 27 and 28 are physical indications (that is, they are display means which are mechanically constructed). For example, these indications could be prints on the frame part 25, could be stickers or plates affixed to the frame part 25, could be formed by engraving or embossing the frame part 25, or could be formed integratedly with the frame part 25. The contents of these menus are the same as those of the system of FIG. 1 which were described with reference to FIG. 1.

Beside the menu display parts 26, 27 and 28, slide-type indication parts 29, 30 and 31 are provided, respectively, to indicate currently selected functions of menus. The slide-type indication parts 29, 30 and 31 are comprised of groove parts 32, 33 and 34 and indicators 35, 36 and 37 respectively. The groove parts 32, 33 and 34 respectively support the indicators 35, 36 and 37, and work as guides when the indicators 35, 36 and 37 are slidingly moved. The indicators 35, 36 and 37 respectively have holes 38, 39 and 40 (see FIG. 4).

Reference numeral 41 denotes a drawing surface which corresponds to the display and drawing area 15 of the display screen 2 of the display device 1. The drawing surface 41 and the indication parts 29, 30 and 31 are located on the coordinate position detecting surface 6 of the tablet 3.

In this embodiment, all areas of the display screen 2 of the display device 1 can be used as the display and drawing area 15, because, since menu displays and selecting switches are provided on the left side part of the frame part 25 of the tablet 4, it becomes unnecessary to display the menu displays and selecting switches on the display screen 2. Such a construction of the present invention can be made possible because the resolution of the tablet 4 is higher than that of display device 1. In other words, even a part of the detecting surface 6 is set so that it is dedicated to a function selection area, while the other part is set so that it is dedicated to a freely usable area (41 of FIG. 3), letting said other area to correspond to a whole area of the display screen 2 of the display device 1, there is no problem regarding resolution of an image displayed on the display screen 2.

Figure 4:
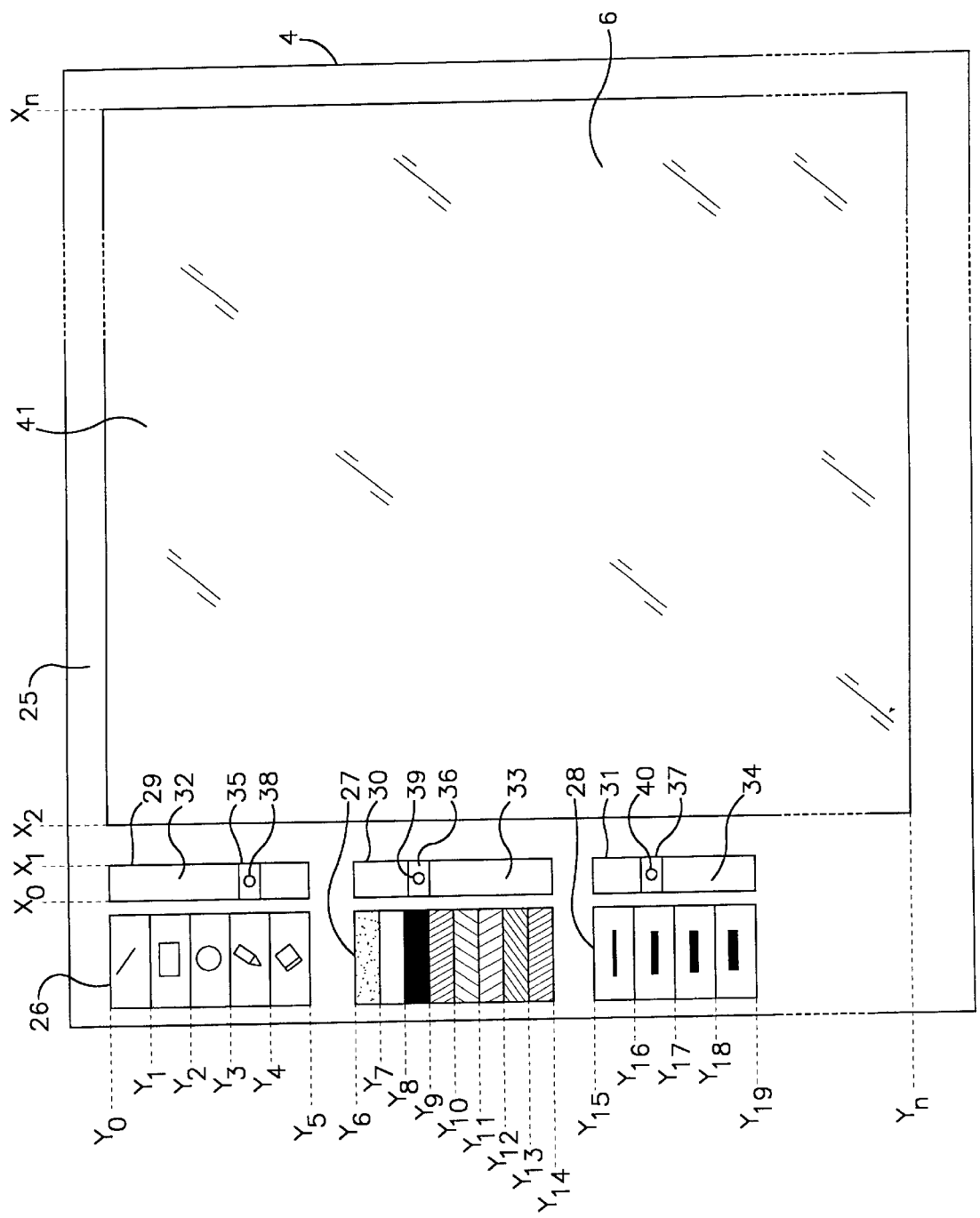
FIG. 4 is a plain view of tablet 3.

FIG. 4 is a plain view of the tablet 3, in which positions of the indication parts 29, 30 and 31 and the drawing sur;

face 41, in the X-Y system of the detecting surface 6 of the tablet 4, are indicated. In FIG. 4, X axis is in the horizontal direction and Y axis is in the vertical direction of the tablet 4. Also, in the drawing, some parts of the tablet 4 are omitted because of a limitation of space, and those parts are indicated by dotted lines.

In this embodiment, the areas of indication parts 29, 30 and 31 are defined to be in the ranges of detecting surface 6, as described below.

In other words, in the detecting surface 6, the indication part 29 is located in the area in the range of x coordinate values of $X_0$-$X_1$ and Y coordinate values of $Y_0$-$Y_5$, the indication part 30 in the range of X coordinate values of $X_0$-$X_1$ and Y coordinate values of $Y_6$-$Y_{14}$, and the indication parts 31 in the range of X coordinate values of $X_0$-$X_1$ and Y coordinate values of $Y_{15}$-$Y_{19}$. The drawing surface 41 is located in the area in the range of X coordinate values of $X_2$-$X_n$ and Y coordinate values of $Y_0$-$Y_n$.

The area of each of the indication parts 29, 30 and 31 is further divided. The area of the indication part 29 is divided into the areas of $X_0$-$X_1$ and $Y_0$-$Y_1$, $X_0$-$X_1$ and $Y_1$-$Y_2$, $X_0$-$X_1$ and $Y_2$-$Y_3$, $X_0$-$X_1$ and $Y_3$-$Y_4$, and $X_0$-$X_1$ and $Y_4$-$Y_5$ which correspond to the areas for "tool for drawing a straight line," "tool for drawing a rectangular," "tool for drawing a circle," "tool for drawing a free line," and "tool for erasing a drawn line," respectively.

The area of the indication part 30 is divided into eight areas, namely, the areas of $X_0$-$X_1$ and $Y_6$-$Y_7$, $X_0$-$X_1$ and $Y_7$-$Y_8$, $X_0$-$X_1$ and $Y_8$-$Y_9$, $X_0$-$X_1$ and $Y_9$-$Y_{10}$, $X_0$-$X_1$ and $Y_{10}$-$Y_{11}$, $X_0$-$X_1$ and $Y_{11}$-$Y_{12}$, $X_0$-$X_1$ and $Y_{12}$-$Y_{13}$, and $X_0$-$X_1$ and $Y_{13}$-$Y_{14}$ which correspond to the areas for "black," "white," "red," "orange," "yellow," "green," "blue," and "purple," respectively.

The area of the indication part 31 is divided into four areas, namely, the areas of $X_0$-$X_1$ and $Y_{15}$-$Y_{16}$, $X_0$-$X_1$ and $Y_{16}$-$Y_{17}$, $X_0$-$X_1$ and $Y_{17}$-$Y_{18}$, and $X_0$-$X_1$ and $Y_{18}$-$Y_{19}$ which correspond to the areas for "very fine line," "fine line," "thick line," and "very thick line," respectively.

Figure 5A:
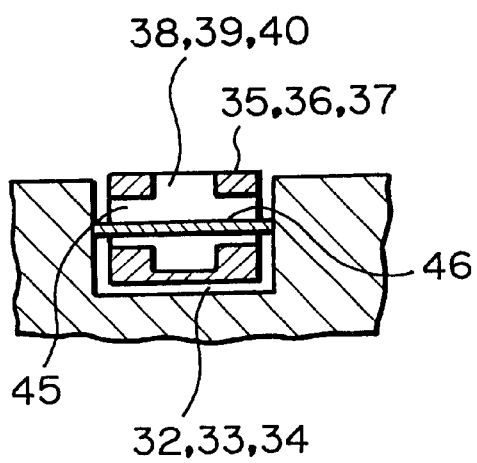
Figure 5B:
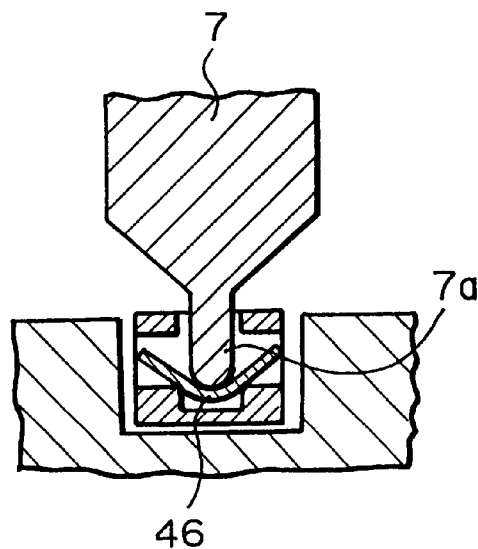
Figure 5C:
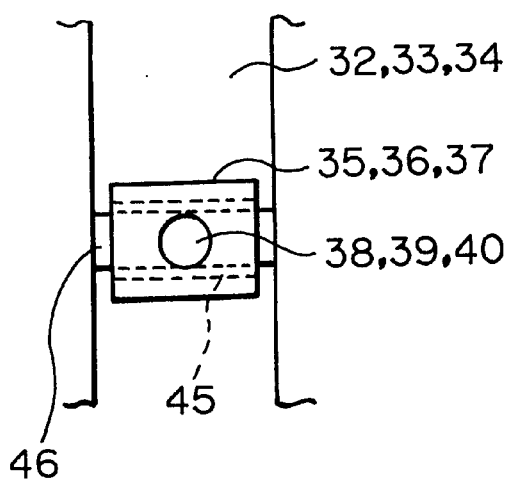

FIGS. 5A, 5B and 5C show an example of a structure of the indicator 35, 36 or 37 of the indication part 29, 30 or 31 wherein FIG. 5A is a sectional view of a groove 32, 33 or 34 and a main part of the indicator 35, 36 or 37 of the indication part 29, 30 or 31, FIG. 5B is a sectional view of the indicator 35, 36 or 37 wherein the tip 7a of the position indicator 7 is inserted in a hole 38, 39 or 40 of the indicator 35, 36 or 37, and FIG. 5C is a plain view of FIG. 5A.

The indicators make it possible to physically and visually indicate functions which have been selected. The selected functions and settings are not changed if an indicator is not moved by using the position indicator 7. However, when something, for example, the hand of a user, is allowed to carelessly touch an indicator, the position of the indicator may move. If the position of the indicator is moved, the currently selected function cannot be correctly recognized visually. Therefore, it is preferable for an indicator not to be moved without using the position indicator 7.

To this end, as a means to stop (engage) an indicator at a desired position, a through hole 45, which passes from one side, which faces one wall of the groove, of the indicator to its opposite side, is provided, and a leaf spring 46 is placed in the hole 45. It is preferable to construct the leaf spring 45 with a material which does not notably interfere with signals sent from the position indicator 7.

When the tip 7a of the position indicator 7 is not inserted into a hole (38, 39, 40), the leaf spring 46 is extended and both ends of the leaf spring 46 touch the walls of a groove. By such means, an indicator (35, 36, 37) is engaged in or stopped at a position. When the tip 7a of the position indicator 7 is inserted into a hole (38, 39, 40), the center of the leaf spring 46 is pushed by the tip 7a and, as a result, the leaf spring 46 is bent. Consequently, both ends of leaf spring 46 separate from the walls of a groove, and the indicator (35, 36, 37) can freely slide.

By providing such an engaging means, unwanted sliding of an indicator can be prevented.

Figure 6A:
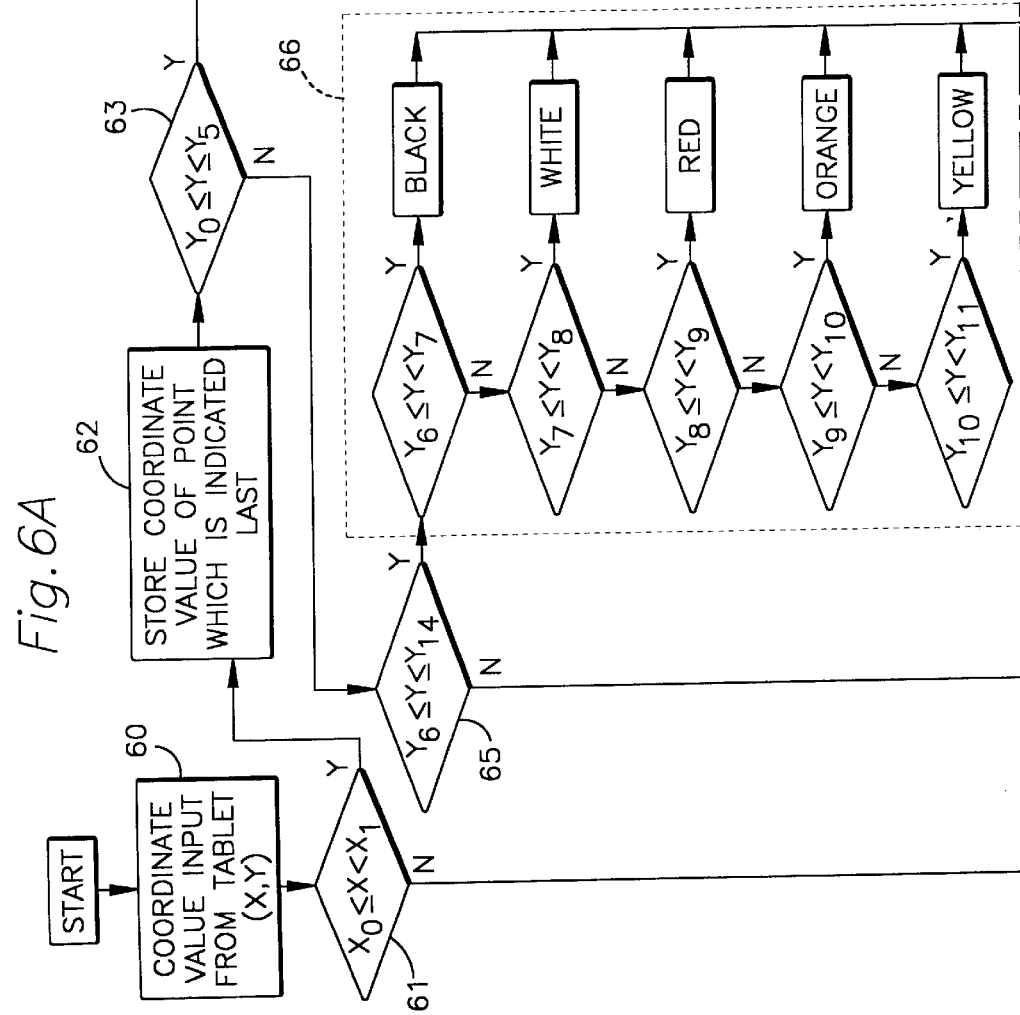
FIG. 6 is comprised of FIGS. 6A and 6B, and is a flow chart of an operation of an embodiment using an indication device of the present invention.
Figure 6B:
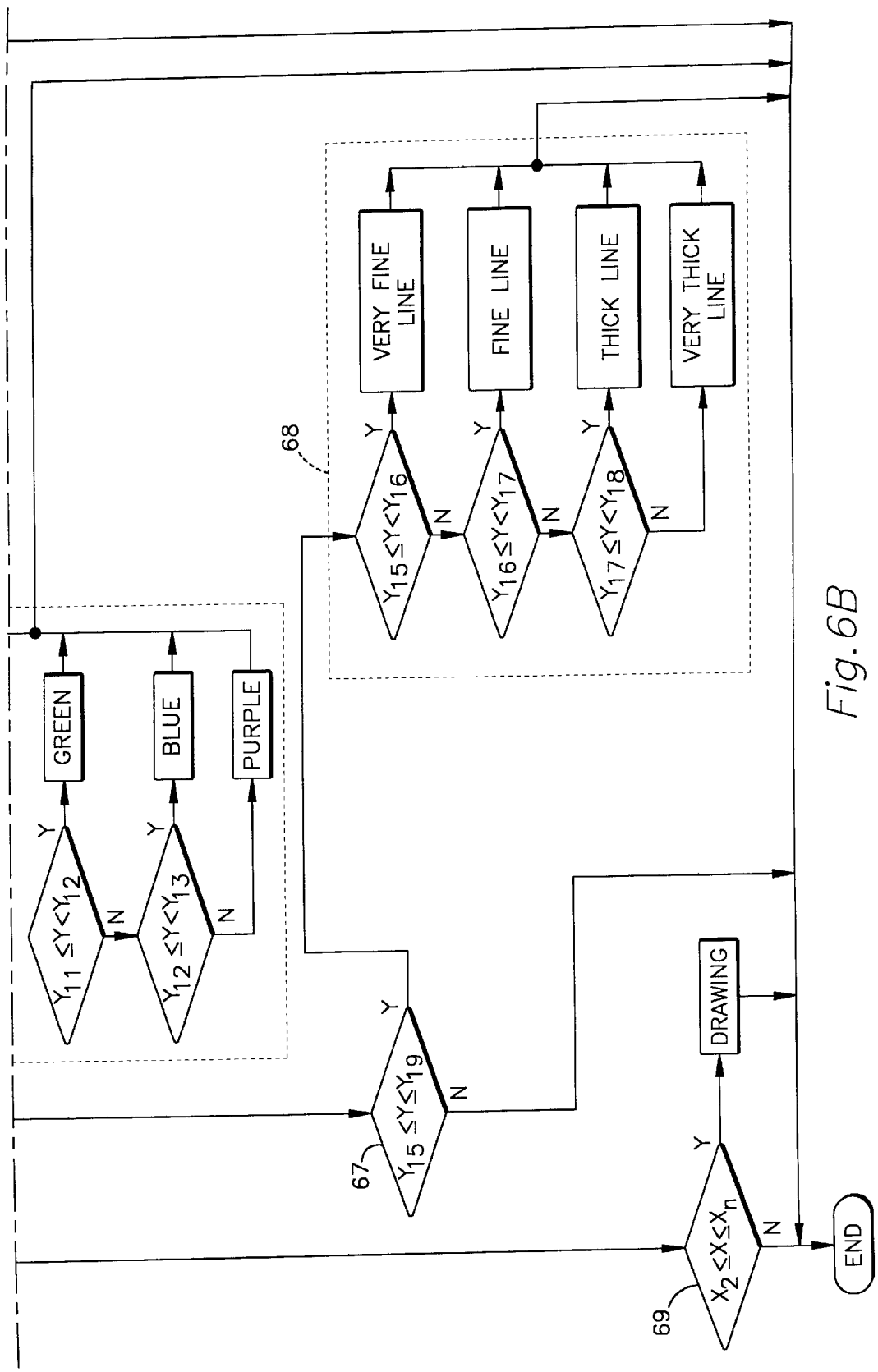

Next, an operation of the embodiment using an indication device of the present invention is explained with reference to FIG. 6. FIG. 6 is comprised of FIGS. 6A and 6B.

When a user selects an application program for drawing, a blank display appears on the display screen 2.

First, the user selects some software functions. In this exemplified operation, it is supposed that the "tool for drawing a free line" from the mode menu, "red" from the color menu, and "fine line" from the line menu are to be selected.

To select the "tool for drawing a free line" from the mode menu, at the beginning, the user inserts the tip 7a of the position indicator 7, which is in a condition to send a coordinate detection signal, into the hole 38 of the indicator 35 of the indication part 29; and then moves (slides) the position indicator 7 together with the indicator 35 along the groove part 32 toward the side of the indication, which represents the "tool for drawing a free line", of the mode menu display part 26, and stop at said indication. Then the user pulls out the tip 7a of the position indicator 7 from the hole 38 of the indicator 35. The reason why the tip 7a of the position indicator 7 is inserted into the hole 38 of the indication part 29 when the position indicator 7 is moved is to mechanically and visually indicate a currently selected function by the indicator 35 and to correctly lead the position indicator 7 to a desired position.

In this example, the coordinate value of the position that position indicator 7 indicated last is in the ranges of $X_0 \leq X \leq X_1$ and $Y_3 \leq Y < Y_4$. At this time, the following processes are executed at the side of the tablet 4, in accordance with a control program indicated in FIG. 6.

The tablet 4 receives signals sent from the position indicator 7 via the antennas 20 which are located under a position that the position indicator 7 indicates (by closely placing the tip 7a at the detecting surface of the tablet 4, or by touching the surface by the tip 7a). The received signals are inputted to the control part 21 (FIG. 2). The control part 21 calculates the position pointed by the position indicator 7 in the X-Y coordinate of the tablet 4, on the basis of the received signals (Step 60).

That is, the control part 21 calculates coordinate values (X,Y) of the positions pointed by the position indicator 7, from the position at which the tip 7a of the position indicator 7 is inserted into the hole 38 of the indicator 35 of the indication part 29 (first position) to the position at which the tip 7a of the position indicator 7 is pulled out from the hole 38 of the indicator 35 (second position) (Step 60).

The control part 21 determines whether X coordinate values among the calculated coordinate values are in the range of $X_0 \leq X \leq X_1$ or not (Step 61).

When X coordinate values are in the range of $X_0 \leq X \leq X_1$, the control part 21 identifies the data as the one inputted from an area for function selection. Then, the control part 21 stores the final calculated coordinate value (X,Y) of serially calculated coordinate values in which X coordinate values are in the range of $X_0 \leq X \leq X_1$, that is, the control part 21 stores the coordinate value of the second position (Step 62).

Next, whether the Y coordinate value of the second position is in the range of $Y_0 \leq Y \leq Y_5$ or not is judged (Step 63). When it is determined that the Y coordinate value is in the range, this process proceeds to routine 64. In routine 64, first, whether the Y coordinate value is in the range of $Y_0 \leq Y < Y_1$ or not is judged at Step 64a. In this example, the Y coordinate value is not in this range, so the process proceeds to Step 64b. At Step 64b, it is judged whether the Y coordinate value is in the range of $Y_1 \leq Y < Y_2$ or not. In this example, the Y coordinate value is not in this range also, so the process proceeds to Step 64c. At Step 64c, it is judged whether the Y coordinate value is in the range of $Y_2 \leq Y < Y_3$ or not. In this example, the Y coordinate value is not in this range also, so the process proceeds to Step 64d. At Step 64d, it is judged whether the Y coordinate value is in the range of $Y_3 \leq Y < Y_4$ or not. In this example, since the coordinate value of the position which is indicated lastly by the position indicator 7 is in the ranges of $X_0 \leq X \leq X_1$ and $Y_3 \leq Y < Y_4$, it is determined at Step 64d that the Y coordinate value is in the range of $Y_3 \leq Y < Y_4$.

The control part 21 reads from the coordinate value storage 22 data which corresponds to the coordinate value and which indicates a function. With respect to the mode menu, the coordinate values in the ranges of $X_0$-$X_1$ and $Y_0$-$Y_1$ correspond to the "tool for drawing a straight line," the coordinate values in the ranges of $X_0$-$X_1$ and $Y_1$-$Y_2$ correspond to the "tool for drawing a rectangular," the coordinate values in the ranges of $X_0$-$X_1$ and $Y_2$-$Y_3$3 correspond to the "tool for drawing a circle," the coordinate values in the ranges of $X_0$-$X_1$ and $Y_3$-$Y_4$ correspond to the "tool for drawing a free line," and the coordinate values in the ranges of $X_0$-$X_1$ and $Y_4$-$Y_5$ correspond to the "tool for erasing a drawn line."

The data read out of the coordinate value storage 22 indicates that the coordinate value corresponds to the "tool for drawing a free line." Based on the data, the control part 21 generates data to select the "tool for drawing a free line" and sends the selection data (data for selecting a function or mode) to the computer 3.

The computer 3, which has received the selecting data, switches the present mode of the application program for drawing to the "tool for drawing a free line" mode (Step 64e).

On the other hand, when it is judged at Step 63 that the Y coordinate value is not in the range of $Y_0 \leq Y \leq Y_5$, the process proceeds to Step 65. At Step 65, it is determined whether the Y coordinate value is in the range of $Y_6 \leq Y \leq Y_{14}$ or not. When the Y coordinate value is in this range, namely, when the position indicated by the position indicator 7 is located in the area of the indication part 30 which is for the color menu, the process proceeds to routine 66. Routine 66 is the routine for outputting signals to select a color of the color menu. The process carried out in routine 66 is similar to that of routine 64.

In this example of the embodiment, the data extracted, or read from the coordinate value storage 22 indicates that the coordinate value corresponds to "red." Based on the thus read data, the control part 21 generates a signal for selection (selection signal) to select "red," and sends the selection signal to the computer 3. The computer receives the selection signal, and switches the present color mode of the application program to "red" mode.

On the other hand, when it is judged at Step 65 that the Y coordinate value is not in the range of $Y_6 \leq Y \leq Y_{14}$, the process proceeds to Step 67. At Step 65, it is determined whether the Y coordinate value is in the range of $Y_{15} \leq Y \leq Y_{19}$ or not. When the Y coordinate value is in this range, that is, when the position indicated by the position indicator 7 is located in the area of indication part 31 which is for the line menu, the process proceeds to routine 68. Routine 68 is the routine for outputting signals to select a kind of line of the line menu. The process carried out in routine 68 is similar to those of routines 64 and 66.

In this example of the embodiment, the data read from the coordinate value storage 22 indicates that the coordinate value corresponds to "fine line." Based on the thus read data, the control part 21 generates a selection signal to select "fine line," and sends the selection signal to the computer 3. The computer receives the selection signal, and switches the present line mode of the application program to "fine line" mode.

On the other hand, when it is judged at Step 67 that the Y coordinate value is not in the range of $Y_{15} \leq Y \leq Y_1$9, the process at this time is ended and a new process is started. An example of how such a judgement is derived is an occurrence of an error during a process of obtaining a coordinate value.

When it is judged at Step 61 that the X coordinate value is not in the range of $X \leq X \leq X_1$, the process proceeds to Step 69. At Step 69, it is determined whether the X coordinate value is in the range of $X_2 \leq X \leq X_n$ or not. When the X coordinate value is in this range, that is, when the position indicated by the position indicator 7 is located in the area of the drawing surface 41 of the tablet 4, the cursor 16 appears at a point on the display screen 2 which corresponds to the point on the drawing surface 41 that is pointed by the position indicator 7, and a line, dot, etc., are drawn in accordance with the selected modes (Step 70). At this time, modes of drawing a free line, "red," and fine line" are selected. Consequently, when the position indicator 7 is moved on the drawing surface 41 with its tip 7a touching (or being closely placed to) the drawing surface 41, the pen-shaped cursor 16 on the display screen 2 moves to follow the movement of the tip 7a of the position indicator 7, and, on the display screen 2, a red and fine line is drawn along the line the cursor 16 traces.

Also, it is possible to use the indication part of the first type (shape), that is, the indication part comprised of a groove part and an indication, to correspond to a scroll bar.

Figure 12:
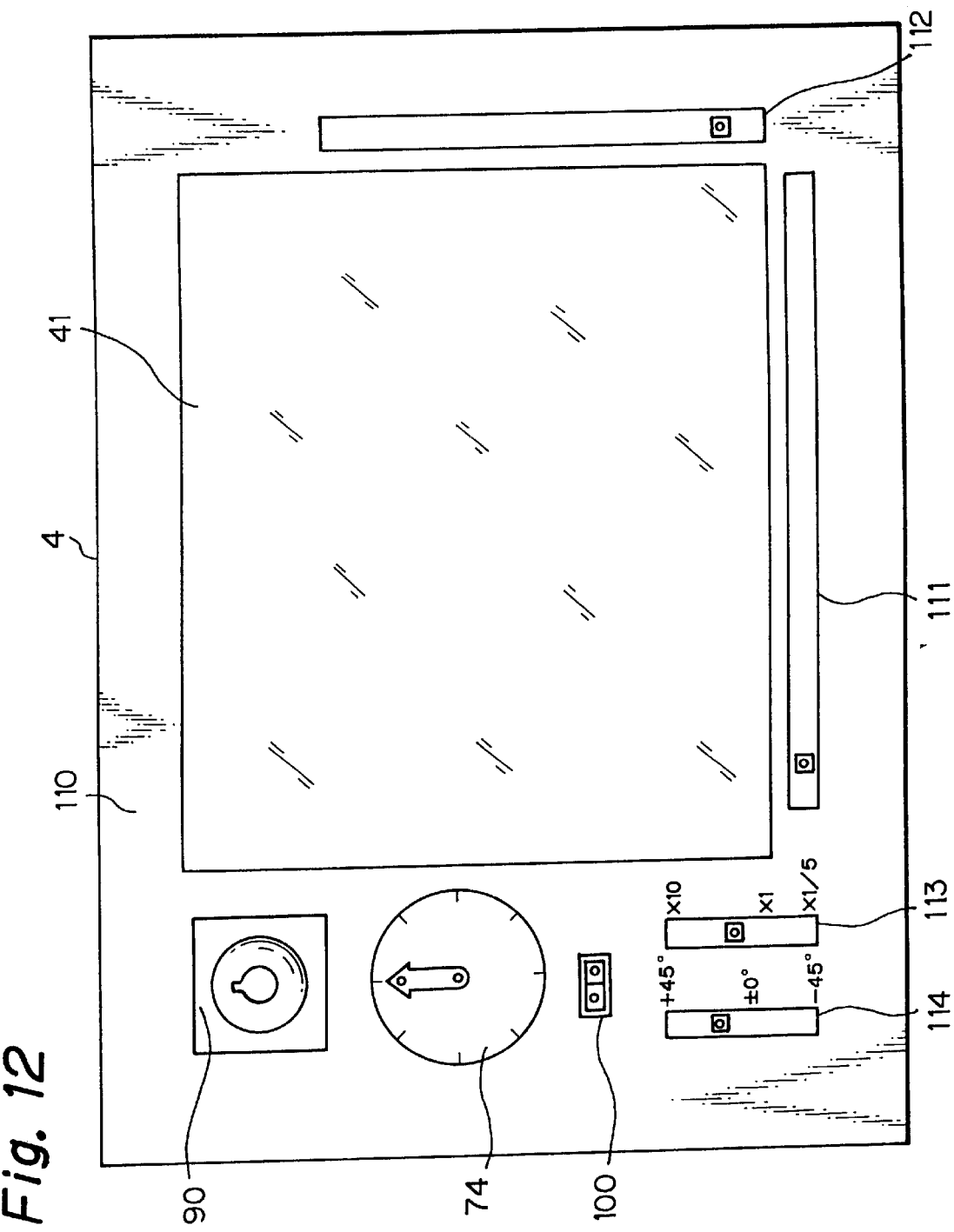
FIG. 12 shows an example of a tablet which integrally incorporates in its frame part a plurality of shapes of indication parts.

For example, for a system which displays on a lower part of a display screen a scroll bar which corresponds to a horizontal or X axis direction, an indication part which is placed at a lower part of the coordinate position detecting surface 6 of the tablet 4 and which has a comparatively long groove extending along X axis direction may be provided (see 111 of FIG. 12). The program may be set in such a way that positions within the indication part correspond relatively to X axis Coordinate positions of an image displayed on the display screen. By means of the above, a scrolling operation of X axis direction on the screen can be performed when the position indicator 7 is moved along the indication part, with the tip 7a of the position indicator 7 being inserted into the indicator of the indication part, in a manner similar to the above example.

When it is necessary to provide a scroll bar which corresponds to a vertical or Y axis direction, a corresponding indication part can be provided on a side part of the coordinate position detecting surface 6 of the tablet 4 (see 112 of FIG. 12).

Also, it is possible to provide for two scroll bars two indication parts, with the two indication parts being placed in parallel. In other words, an indication part can be placed at any location on the coordinate position detecting surface 6.

By means of placing on a tablet an indication part corresponding to a scroll bar, it becomes possible to remove the scroll bar from a display screen, and the settings of a system can still be visually checked.

Figure 7:
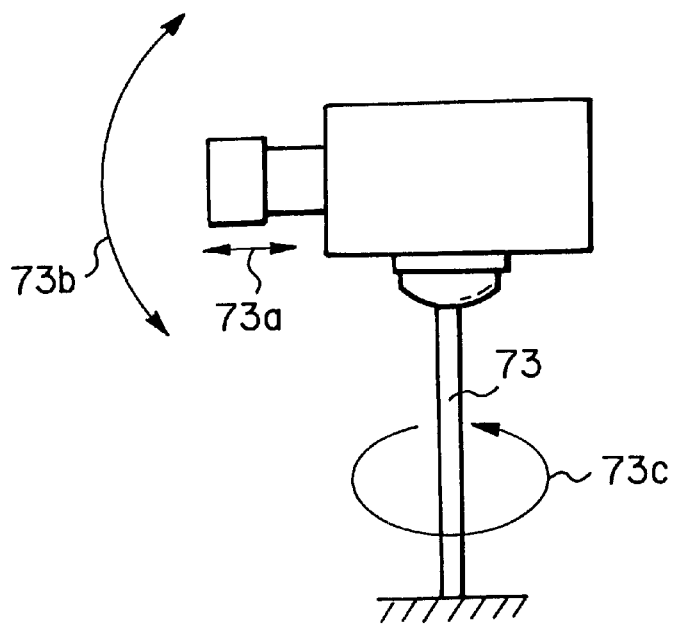
FIG. 7 is a drawing for explaining functions of a virtual camera.

Also, in a system which has a virtual camera, it is possible to use the indication part of the first type, that is, the indication part comprised of a groove part and an indication, to correspond to each of switches of functions of the virtual camera. FIG. 7 is a drawing for explaining functions of a virtual camera.

For example, it is possible to use the first type indication part as a switch for a zoom function (73a of FIG. 7); namely, it can be used as a switch for enlarging and miniaturizing an image (see 113 of FIG. 12). In such a case, the program may be set in such a way that the positions within the indication part relatively correspond to the magnification values of an image.

For example, let us suppose that an indication part corresponding to an enlarging and miniaturizing switch is placed on an area which ranges $X_1 \leq X \leq X_2$ and $Y_{20} \leq Y \leq Y_{25}$ on the coordinate position detecting surface 6. In such a case, it can be programmed in a manner that Y coordinate values of $Y_{20} \leq Y < Y_{21}$ correspond to a magnification of ten times (×10), $Y_{21} \leq Y < Y_{22}$ correspond to a magnification of five times (×5), $Y_{22} \leq Y < Y_{23}$ correspond to no magnification (×1), $Y_{23} \leq Y < Y_{24}$ correspond to a magnification of one half time (×½), and $Y_{24} \leq Y < Y_{25}$, correspond to a magnification of one fifth time (×⅕), for example. It should be remembered that the settings of corresponding relations between magnifications and coordinate values can be made arbitrarily, and the settings can be more finely made when necessary.

Also, it is possible to use the first type indication part as a switch for an up/down rotation function (73b of FIG. 7) of the virtual camera (see 114 of FIG. 12). In this case, the program may be set in a manner that the positions within the indication part relatively correspond to angles of up/down rotation.

By means of placing on a tablet indication parts corresponding to switches for functions (zoom and up/down rotation) of the virtual camera, it becomes possible to remove these switches from a display screen, and yet the setting conditions can still be visually checked.

Figure 8A:
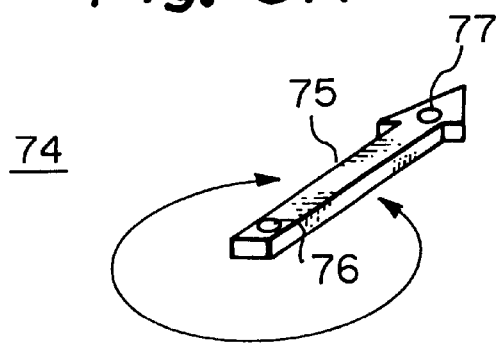
Figure 8B:
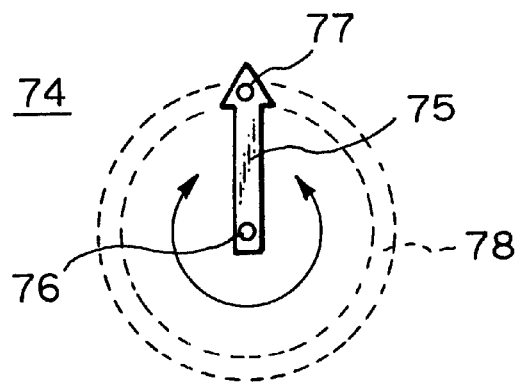

2. An Embodiment of an Indication Part of a Second Shape:

FIGS. 8A and 8B show an indicator of an indication part of a second shape wherein FIG. 8A is a perspective view of an indicator 75 of an indication part 74 and FIG. 8B is a plain view of the indicator 75 of the indication part 74. This indication part 74 is also placed on the coordinate position detecting surface 6 of the tablet 4. The indication part 75 is a shape of a bar, and has an arrow-shaped portion. One end of the indicator 75 is pivotally engaged by a pin 76, and the indicator 75 is rotatable about the pin 76 wherein the position of the pin 76 is a center of rotation. That is, the indicator 75 moves along circumference of a circle which is centered at the position of the pin 76. To the other end of the indicator 75, a hole 77 into which the tip 7a of the position indicator 7 is inserted is provided. An area 78 of FIG. 8B, which is delineated by dotted lines, is the area that the hole 77 passes through when the indicator 75 is rotated.

This shape of indicator can be used, for example, in place of a display of a control switch of said virtual camera which controls a horizontal rotation (73c of FIG. 7) of the virtual camera wherein the axis 73 is the center axis of rotation. In such a case, the program may be set in a manner that positions within the area 78, on which the hole 77 of the indicator 75 passes, relatively correspond to horizontal rotation angles of the virtual camera.

For example, the program may be set in a manner that position of the hole 77 at the condition indicated in FIG. 8B that is, at the state that the direction directed by the indicator 75 is right upward direction, corresponds to the rotation angle of 0° degree and one round of rotation corresponds to the rotation angle of 360° degree, and the coordinate value of the position of right downward corresponds to the rotation angle of 180° degree.

A user inserts the tip 7a of the position indicator 7 into the hole 77 of the indicator 75 and rotates the indicator 75 to a desired angle. For example, when it is desired to horizontally rotate the virtual camera the rotation angle of 180° degrees, the indicator 75 is rotated to the right down direction or the indicator 75 is rotated for 180° degrees, with the tip 7a of the position indicator 7 being inserted into the hole 77 of the indicator 75. In accordance with the rotation, the point of view of the virtual camera horizontally rotates 180° degrees, in which the center axis of the horizontal rotation of the virtual camera is the axis 73, and, as a result, an image displayed on a display screen moves. After the virtual camera is rotated to the desired angle, the user pulls out the tip 7a of the position indicator 7 from the hole 77 of the indicator 75.

Since the indicator 77 stays at a position which corresponds to a rotational angle, a rotational angle of the virtual camera can be easily checked visually by observing the indicator 77.

Also, it is possible to program in a manner that coordinate values of the area 78 of the indicator 74 correspond to functions such as tools and the system executes a function corresponding to an indicated coordinate value. For example, when it is used as a switch to select one of two functions, the system can be programmed in a manner that coordinate values in the right half area of the area 78 correspond to one function and those in the left half area of the area 78 correspond to another. By dividing the area 78 more finely, more functions can be set to correspond to coordinate values of the thus subdivided areas.

That is, like the area of the indication part of the first shape, the area 78 can be defined to correspond to many kinds of functions, switches, etc. Namely, the indication,part can be used in place of displays of other functions.

3. An Embodiment of an Indication Part of a Third Shape:

Next, an example of an indication part which can be used in place of a display of functions which can be used in a system which comprises a digitizer which can detect a tilting angle of a position indicator with respect to a tablet and a rotation angle of the position indicator.

Figure 9:
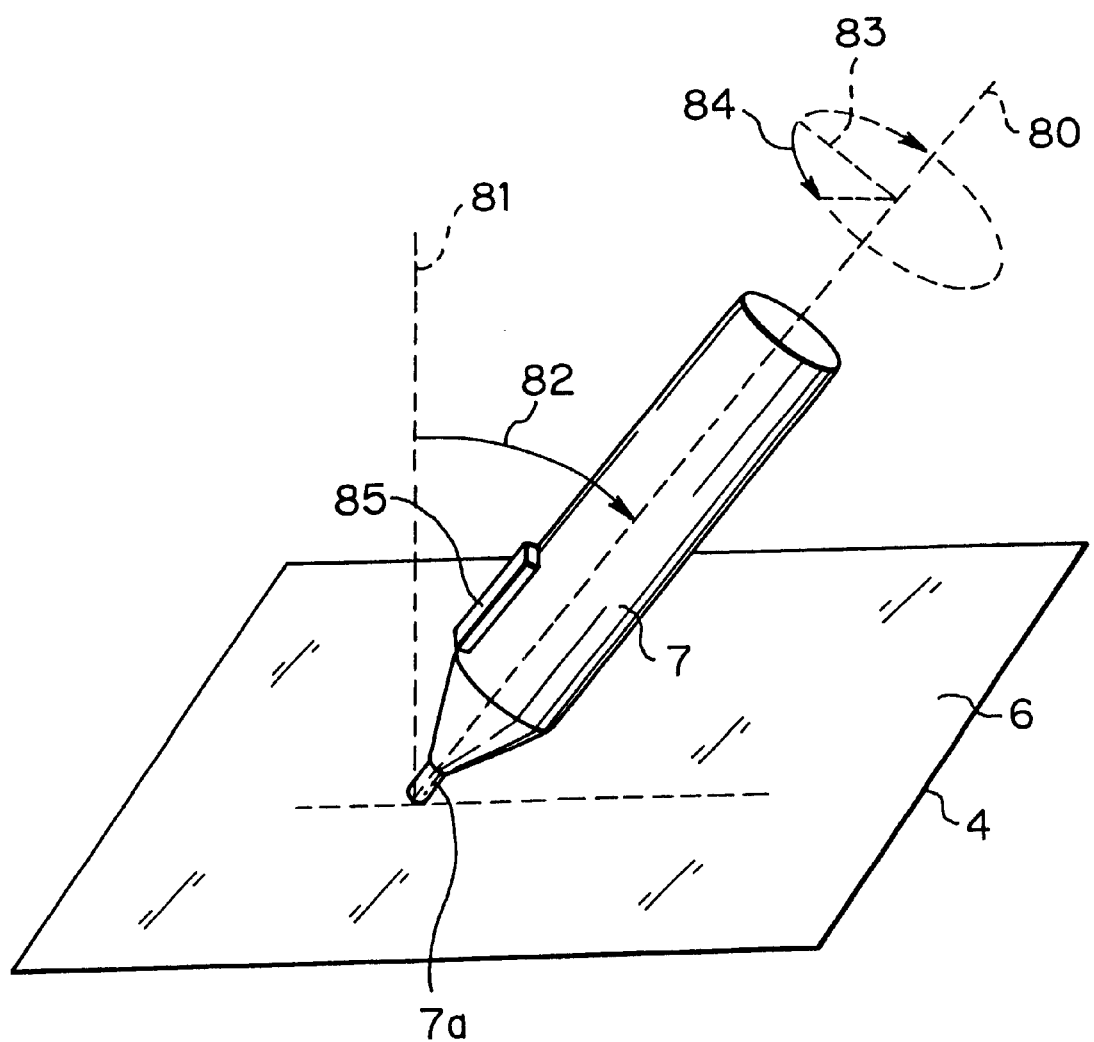
FIG. 9 is a drawing to explain a tilting angle and a rotation angle of a position indicator.

FIG. 9 is a drawing to explain a tilting angle and a rotation angle of the position indicator 7. A dotted line 80 indicates the center axis of the position indicator 7, and it indicates a reference position to measure a tilting angle. A line 82 indicates a tilting angle. For example, when the dotted line 80 (the center of the position indicator 7) is positioned on the dotted line 81, the tilting angle is 0° degree. An angle of a rotation of the position indicator 7 about the dotted line 80 is defined as a rotation angle. A dotted line 83 indicates the reference position for measurement of a rotation angle, and a line 84 indicates the rotation angle. An element 85 is a mark to roughly check a rotation angle of the position indicator 7, visually.

In the system using such a digitizer, it is possible to use an application program for tilting an axis of an image inputted in a three dimension manner and for rotating the image about an axis, on the display screen 2 of the display device 1.

In such an application program, an icon which indicates a switch to switch from one mode to a mode of rotating and tilting an image is displayed on the display screen 2. A user points to a position on the coordinate position detecting surface 6 of the tablet 4, which corresponds to the position of the icon, by the position indicator 7. Then, when it is desired to rotate an image about Z axis of three dimensional axes X, Y and Z (it is supposed that the vertical axis direction of display screen to be Z axis and transversal axis direction to be X axis), the tip 7a of the position indicator 7 is made to contact with (or is placed closely to) a predetermined position of the coordinate position detecting surface 6 of the tablet 4, and the position indicator 7 is rotated. Then, the image rotates in accordance with a detected rotation angle. When it is desired to tilt an axis of the image toward X axis direction, the position indicator 7 is tilted toward X axis direction.

At the same time, a display which indicates to which direction and by how much an angle the image is tilted and rotated is displayed on the display screen 2.

Figure 10A:
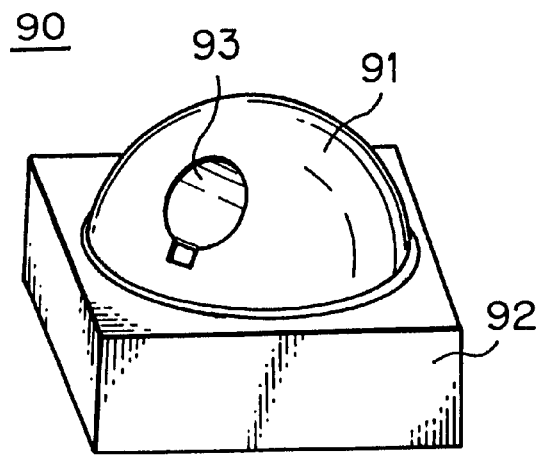
Figure 10B:
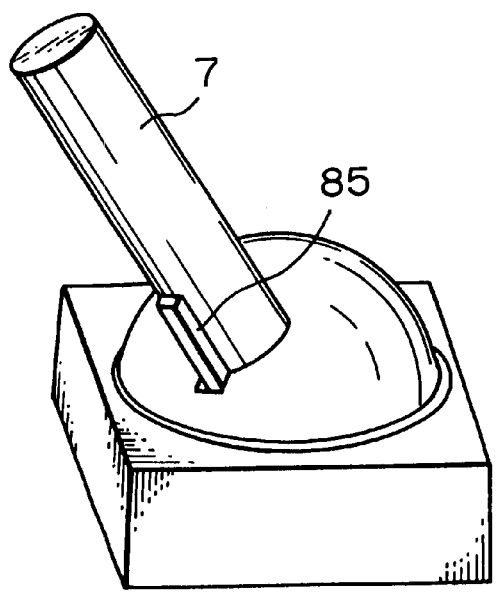
Figure 10C:
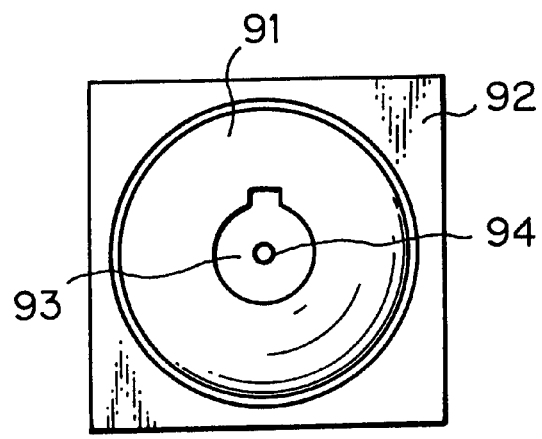

FIGS. 10A, 10B and 10C show an example of an indication part which is suitable to use with a system which comprises a digitizer able to detect a tilting angle and a rotation angle of the position indicator 7 and uses a program to tilt and rotate an image, like the above; wherein FIG. 10A is a perspective view of the indication part, FIG. 10B shows a condition that the position indicator 7 is inserted in an indicator of the indication part, and FIG. 10C is a plain view of the indication part.

An indication part 90 is comprised of an indicator 91 which is comprised of a spherical surface and a support 92 which supports the indicator 91. The indicator 91 is provided with a hole 93 into which a part of the position indicator 7, from the tip 7a to a part of its body, is inserted. The indicator 91 is engaged with the support 92 in such a manner that the indicator 91 is movable in accordance with a movement of the position indicator 7 which is inserted into the hole 93. This indication part 90 is also placed on the coordinate position detecting surface 6 of the tablet 4.

FIG. 10C shows that the hole 93 is positioned right upward direction. An area 94 is the area on the coordinate position detecting surface 6 which is pointed by the tip 7a of the position indicator 7 when the position indicator 7 is inserted into the hole 93. The position of the area 94, that is, the position pointed by the position indicator 7 which is inserted into the hole 93 does not change whether the position indicator 7 is rotated or tilted. That is, the position indicator 7 is rotated and tilted about the area 94, the area 94 being the center.

When this indication part 90 is used, the position indicator 7 is inserted into the hole 93 as shown in FIG. 10B, first. When position indicator is inserted into the hole 93, the tip 7a of the position indicator 7 touches (or is placed closely to) the area 94 of the coordinate position detecting surface 6 of the tablet 4. The antennas 20 which are placed under the area 94 receive signals from the position indicator 7. The control part 21 derives a coordinate value on the basis of the received signals. Then, the control part 21 determines to which function the coordinate value corresponds. In the coordinate value storage, the data describing that coordinate values in the area 914 correspond to a function of rotating a three dimensional image is stored. Based on the result of the determination, the control part 21 of the tablet 4 generates and sends a signal to instruct the computer 3 to switch from a current mode to the mode of rotating and tilting a three dimensional image. The computer 3, which received the signal, enters the mode of rotating and tilting a three dimensional image. In this mode, the tablet 4 detects a rotation angle and a tilting angle of the position indicator 7. Based on the detected rotation and tilting angles, the computer 3 executes processes of rotating and tilting an image. In this system, the processes of rotating and tilting an image are the same as those of prior arts systems.

Also, for example, it is possible to set the system in such a manner that actual tilting angles of the position indicator 7 do not correspond degree by degree to the tilting angles of an axis of an image on a display. For example, the corresponding relation between tilting angles of the position indicator 7 and tilting angles of an axis of an image can be set to any ratio. For example, when the ratio between tilting angles of the position indicator 7 and tilting angles of an axis of an image is set to 1 by 2, an image will be tilted by 20° degrees when the position indicator 7 is tilted by 10° degrees.

After the image is rotated and tilted to desired angles, a user pulls out the position indicator 7 from the hole 93. When the signal input to the tablet 4 from the area 94 is stopped, the control part 21 generates a signal to terminate the mode of rotating and tilting an image, and sends the signal to the computer 3. The computer 3, which received the signal, terminates the mode of rotating and tilting a three dimensional image, and returns to the former mode.

Since the position of the hole 93 stays in the same position as when the position indicator 7 is pulled out, the rotation and tilting angles of the position indicator 7 inputted to the computer 3, that is, how the image is rotated (i.e., the rotated and tilted angles of the image), can be easily visually checked.

Also, it is possible to set the system in such a manner that detected rotation angles and tilting angles correspond to a variety of functions. For example, it is supposed that the digitizer can detect rotation angles of the position indicator 7 in the range of $0° \leq R \leq 360°$ (wherein R denotes a rotation angle), and can detect tilting angles of the position indicator 7 in the range of $0° \leq D \leq 60°$ (wherein D denotes a tilting angle) about a vertical line from the coordinate position detecting surface 6. Also, it is supposed that the coordinate values of the area 94 indicate to select a color mode and a line mode, and it is supposed that rotation angles of $0° \leq R < 90°$ correspond to "black," $90° \leq R < 180°$ correspond to "red," $180° \leq R < 270°$ correspond to "green" and $270° \leq R < 360°$ correspond to "blue," and tilting angles of $0° \leq D < 15°$ correspond to "very fine line," $15° \leq R < 30°$ correspond to "fine line," $30° \leq R < 45°$ correspond to "thick line," and $45° \leq R < 60°$ correspond to "very thick line." In such a case, a function to select a color mode and a line mode is selected when a position indicator is inserted into the indication part, that is, when the tip of the position indicator touches the area 94. Then, for example, if a detected rotation angle is 100° degrees and a detected tilting angle is 20° degrees, the mode of the system will become "red" and "fine line" modes.

By setting the system in such a manner that rotation angles and tilting angles of the position indicator 7 correspond to a variety of functions and switches, those functions and switches which are displayed on a display screen can be expressed mechanically by using this indication part.

Figure 11A:
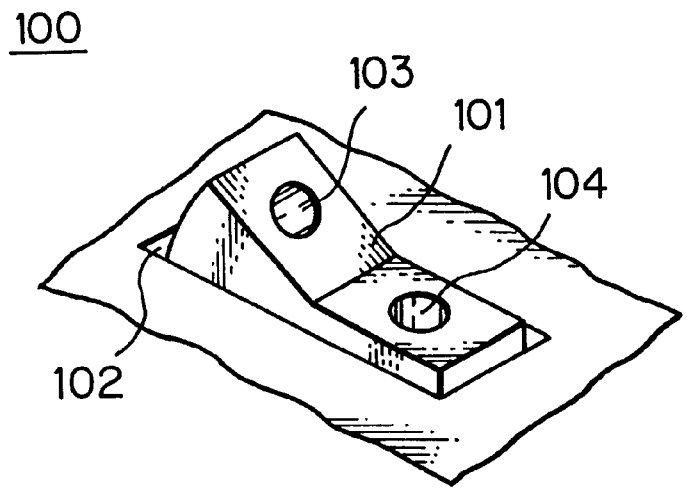
Figure 11B:
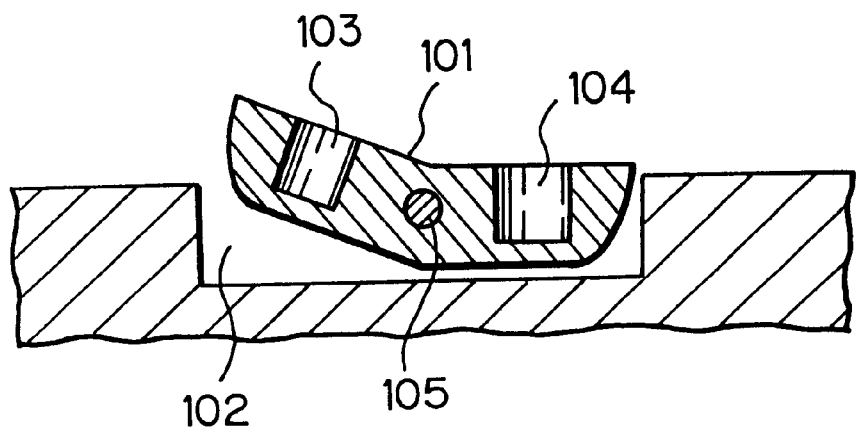

4. An Embodiment of an Indication Part of a Forth Shape:

FIGS. 11A and 11B show another shape of an indication part, wherein FIG. 11A is a perspective view of an indicator of the indication part and FIG. 11B is a sectional view of the indication part. This indication part is also placed on the coordinate position detecting surface 6 of the tablet 4.

An indication part 100 shown in FIGS. 11A and 11B can be used in a system which displays as an icon on the display screen 2 of display device 1 a switch to switch between functions and can be used in place of the icon in the system.

The switch can be used as a switch to invert a color of a displayed image which is displayed on the display screen 2 in two colors, for example.

This indication part 100 is similar in shape to a common switching switch or an on/off switch. The indication part 100 is comprised of an indicator 101 of a seesaw shape and a groove 102 in which the indicator 101 is placed. The indicator 101 has a hole 103 on one of its half parts and a hole 104 on the other. The indicator 101 is supported by a pin 105 which is engaged with walls of the groove 102, and moves like a seesaw.

The system may be set in such a manner that the position below the hole 103 of the indication part 100 (first coordinate position) corresponds to a first function and the position below the hole 104 (second coordinate position) corresponds to a second function.

Next, a switching operation using indication part 100 will be briefly described.

It is supposed that the second function is currently selected. When a user desires to switch from the second function to the first function, he inserts the tip 7a of the position indicator 7 into the hole 103 and presses the indicator 101. After pressing the indicator 101, he removes the tip 7a of the position indicator 7 from the hole 103. Since this indicator 101 is in the shape of seesaw, the indicator 101 tilts towards a pressed direction. At the time the indicator 101 is pressed, the tip 7a of the position indicator 7 approaches the coordinate position detecting surface 6 of the tablet 4, and then, the first position is pointed (or contacted) by the position indicator 7. The seesaw shaped indicator 101 tilts toward the direction which indicates the selected function, and remains at the tilted position.

When the first position is pointed (or contacted) by the position indicator 7 (or the tip 7a of the position indicators is placed closely at the first position of the detecting surfaces 6), the control part 21 of the tablet 4 determines to which function the coordinate value of the indicated first position corresponds. The coordinate value indicates that the second function to be stopped and the first function to be executed. The control part 21 generates a signal to instruct the computer 3 to stop the second function and to execute the first function, and sends the signal to the computer 3. In the case that the second position is indicated by the position indicator 7, the control part 21 generates a signal to instruct the computer 3 to stop the first function and to execute the second function, and sends the signal to the computer 3.

By using this indication part, a switch displayed as an icon on the display screen 2 of the display device 1 can be removed from the display screen 2, and, further, a current setting condition can be visually checked easily.

5. An Embodiment which Includes Variety Shapes of Indication Parts:

FIG. 12 shows an example of the tablet 4 which integrally incorporates in its frame part 110 a plurality of shapes of indication parts as described above. All indication parts are positioned on the coordinate position detecting surface 6 of the tablet 4. Also, the indication part 74 has an indication of a circular scale to indicate, for example, angles, direction, etc., an indication part 113 has on its right side an indication to indicate magnifications, and an indication part 114 has on its right side an indication to indicate angles.

Also, it is possible to further incorporate in the frame part 110 of FIG. 12 the indication part and the display part which are provided on the frame part 25 of FIG. 3. That is, any kinds of and any numbers of indication parts and display parts can be provided to the tablet.

Figure 1:
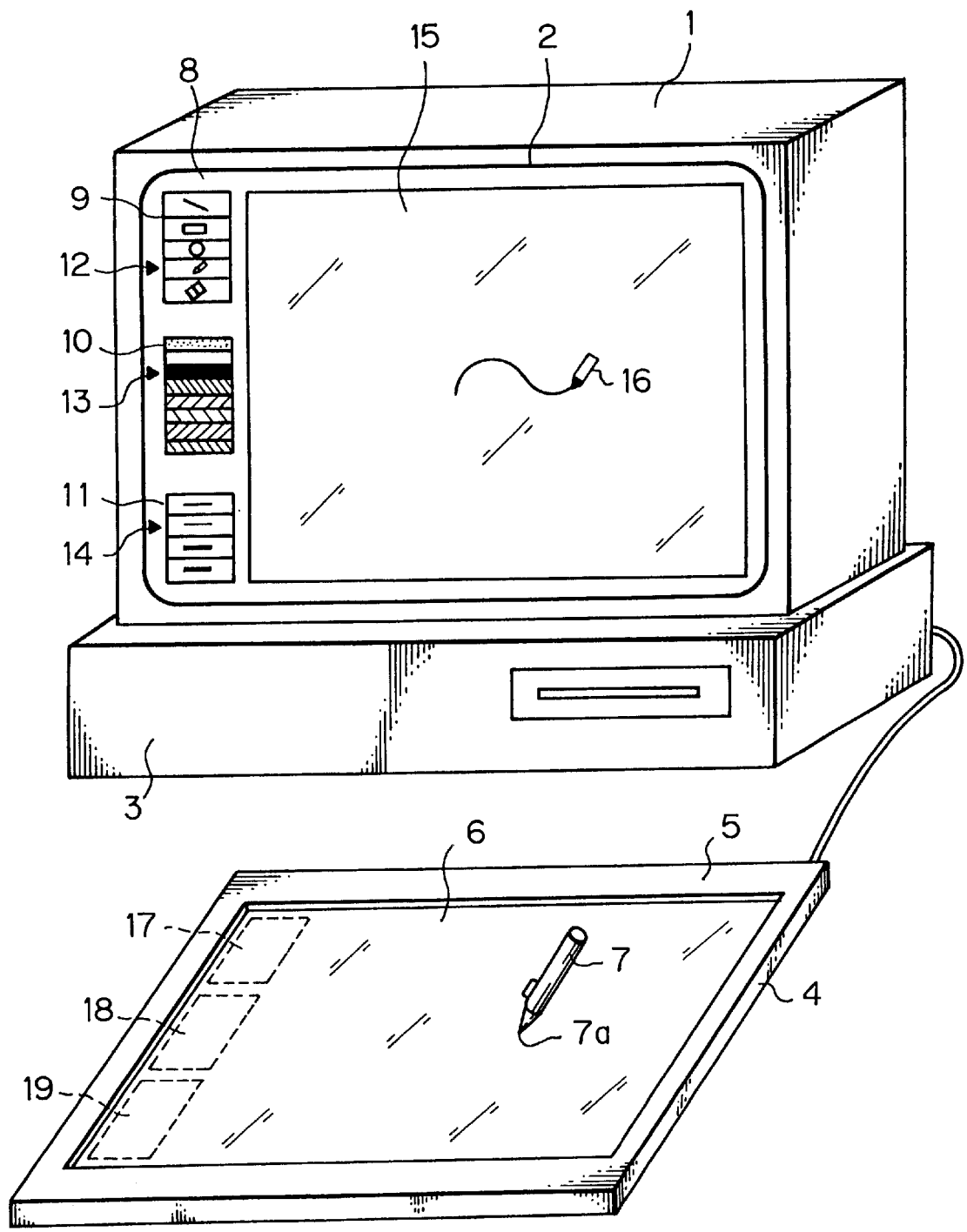
FIG. 1 shows an example of a conventional computer system which utilizes a digitizer which comprises a tablet and a pen-shaped position indicator.
Figure 13:
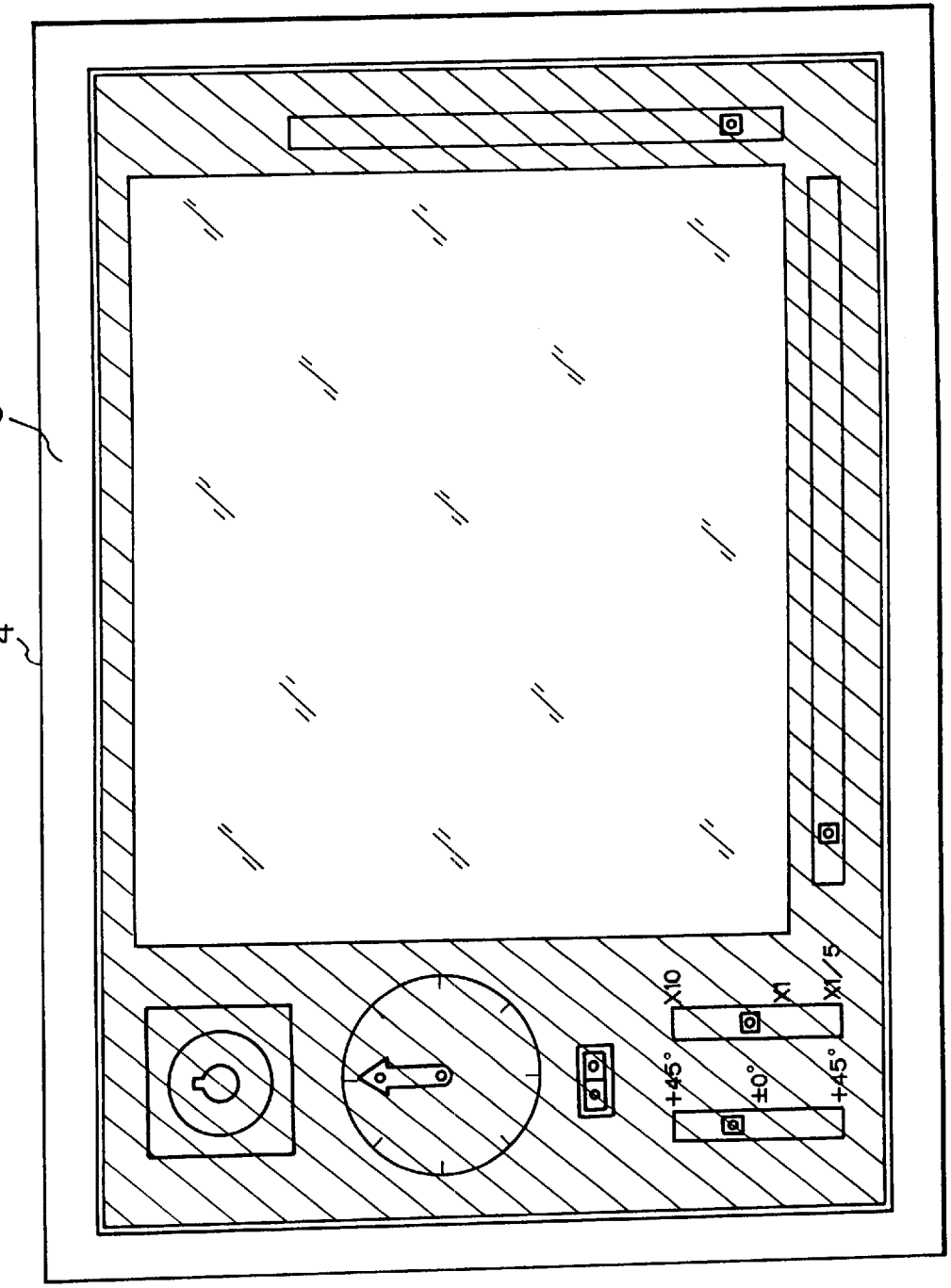
FIG. 13 shows an exemplified construction of a separately constructed attachable/detachable part which includes indication parts.

Also, it is possible to separately construct the part of the frame part which includes indication parts, so it is attachable/detachable onto/from a tablet such as the tablet 1 of FIG. 1. FIG. 13 shows an exemplified construction of separately constructed attachable/detachable part which includes indication parts. Numeral 5 of FIG. 13 denotes a frame part of the prior art tablet 4 of FIG. 1, and the shaded part is the separately constructed attachable/detachable part.

Also, it is possible to respectively construct for each application program a corresponding attachable/detachable part, and to change an attachable/detachable part to correspond to an application program when an application program is changed.

What is claimed is:

1. In a system comprising a digitizer which includes a position indicator and a coordinate detecting device which is in the form of a tablet, has a coordinate detecting surface which is indicated by said position indicator, and has a selection/indication area within said coordinate detecting surface to select/indicate data processing functions; a display device which has a display screen to display an image; and a computer which controls said digitizer and said display device; wherein the data processing functions are selected/indicated by using said position indicator to perform an image processing; said system comprising:

an indication part which is located within said selection/indication area of said coordinate detecting surface of said coordinate detecting device and makes it possible the status of selections/indications of the data processing functions to be visually observed, and a control means which selects a desired data processing function based on a data inputted via said indication part and processes a data based on the selected data processing function, wherein said indication part comprises
an engaging means which temporarily engages with said position indicator and is movable together with engaged said position indicator,
an indicator means, which is movable with said engaging means which is temporarily engaged with said position indicator, to visually indicate a selected/indicated data processing function, and
a supporting means to engage and support said indicator means.

2. The system set forth in claim 1 wherein
said position indicator is the shape of a pen, and
said engaging means is a hole into which a tip of said position indicator is inserted.

3. The system set forth in claim 1 or 2 wherein
said supporting means of said indication part is the shape of a groove, and
said indicator means temporarily engages with said position indicator and is movable together with engaged said position indicator along said groove.

4. The system set forth in claim 1 or 2 wherein
said indicator means of said indication part has one said engaging means at one end and another said engaging means at another end, and
said supporting means supports said indicator means in such a manner that said indicator means switches its indication status of selection/indication from one to another when said position indicator is engaged with one of said engaging means which was not engaged with said position indicator at the latest selection.

5. The system set forth in claim 1 or 2 wherein
said indicator means of said indication part is the shape of a bar, said engaging means is provided at one end of said indicator means, and said supporting means is provided at another end of said indicator means and supports said indicator means in a manner that said indicator means is rotatable around said supporting means.

6. In a system comprising a digitizer which includes a position indicator which is in the form of a pen and a coordinate detecting device which is in the form of a tablet, has a coordinate detecting surface which is indicated by said position indicator, and has a selection/indication area within said coordinate detecting surface to select/indicate data processing functions, wherein a rotational angle and a tilting angle of said position indicator with respect to its indicating position of said coordinate detecting surface can be detected; a display device which has a display screen to display an image; and a computer which controls said digitizer and said display device; wherein the data processing functions are selected/indicated by using said position indicator to perform an image processing; said system comprising:

an indication part which is located within said selection/indication area of said coordinate detecting surface of said coordinate detecting device and makes it possible the status of selections/indications of the data processing functions to be visually observed, wherein said indication part comprises an indication means which is comprised of a part having a spherical surface and an engaging means, wherein said engaging means is in the form of a hole on said spherical surface and is a means into which said position indicator is inserted to engage said position indicator with said indication part wherein said hole is also a means to visually indicate a rotational angle and a tilting angle of said position indicator, and a supporting means which engages and supports said indication means in such a manner that said position indicator can be rotated and tilted to a desired position when said position indicator is inserted in said engaging means and that said supporting means maintains the same position of said indication means as that when said position indicator is pulled out from said engaging means; and a control means which executes data processing functions in accordance with a rotation angle data and a tilt angle data inputted in association with said indication means.

7. The system set forth in claim 1, 2 or 6 further comprising means for storing a coordinate value of a last indicated position which is indicated by said position indicator, wherein said last indicated position is located in the area of said coordinate detecting surface on which said indication part is placed.

8. The system set forth in claim 1, 2 or 6 wherein said indication part includes a display part to which a physical expression is provided.

9. A coordinate detecting device used in a digitizer which includes a position indicator, wherein the coordinate detecting device is in the form of a tablet, comprising an indication part which is positioned within a selection/indication area, to select/indicate a data processing function, of a coordinate detecting surface of said coordinate detecting device and makes it possible the status of selections/indications of the data processing functions to be visually observed, wherein said indication part includes an engaging means which temporarily engages with said position indicator and is movable together with engaged said position indicator, an indicator means, which is movable with said engaging means which is temporarily engaged with said position indicator, to visually indicate a selected/indicated data processing function, and a supporting means to engage and support said indicator means.

10. The coordinate detecting device set forth in claim 9 wherein said position indicator is the shape of a pen, and said engaging means is a hole into which a tip of said position indicator to be inserted.

11. The coordinate detecting device set forth in claim 9 or 10 wherein said supporting means of said indication part is the shape of a groove, and said indicator means temporarily engages with said position indicator and is movable together with engaged said position indicator along said groove.

12. The coordinate detecting device set forth in claim 9 or 10 wherein said indicator means of said indication part has one said engaging means at one end and another said engaging means at another end, and said supporting means supports said indicator means in such a manner that said indicator means switches its indication status of selection/indication from one to another when said position indicator is engaged with one of said engaging means which was not engaged with said position indicator at the latest selection.

13. The coordinate detecting device set forth in claim 9 or 10 wherein said indicator means of said indication part is the shape of a bar, said engaging means is provided at one end of said indicator means, and said supporting means is provided at another end of said indicator means and supports said indicator means in a manner that said indicator means is rotatable around said supporting means.

14. A coordinate detecting device, in the form of a tablet, of a digitizer, wherein said digitizer includes a position indicator in the form of a pen and can detect a rotational angle and a tilting angle of said position indicator with respect to its indicating position of a coordinate detecting surface of said coordinate detecting device, comprising an indication part which is located within a selection indication area of said coordinate detecting surface of said coordinate detecting device and makes it possible the status of selections/indications of data processing functions to be visually observed, wherein said indication part comprises an indication means which is comprised of a part having a spherical surface and has an engaging means, wherein said engaging means is in the form of a hole on said spherical surface and is a means into which said position indicator is inserted to engage said position indicator with said indication part, wherein said hole is also a means to visually indicate a rotational angle and a tilting angle of said position indicator, and a supporting means which engages and supports said indication means in such a manner that said position indicator can be rotated and tilted to a desired position when said position indicator is inserted in said engaging means and that said supporting means maintains the same position of said indication means as that when said position indicator is pulled out from said engaging means.

15. The coordinate detecting device set forth in claim 9, 10 or 14 further comprising
means for storing a coordinate value of a last indicated position which is indicated by said position indicator, wherein said last indicated position is located in the area of said coordinate detecting surface on which said indication part is placed.

16. The coordinate detecting device set forth in claim 9, 10 or 14 wherein
said indication part includes a display part to which a physical expression is provided.

17. An assisting apparatus which is used with a digitizer and separately constructed from said digitizer, wherein said digitizer includes a position indicator and a coordinate detecting device which is in the form of a tablet, has a coordinate detecting surface which is indicated by said position indicator, and has a selection/indication area within said coordinate detecting surface to select/indicate data processing functions, comprising
an indication part which is constructed in such a manner that it is placed within and onto said selection/indication area of said coordinate detecting surface of said coordinate detecting device and makes it possible the status of selections/indications of data processing functions to be visually observed,
wherein said indication part includes
an engaging means which temporarily engages with said position indicator and is movable together with engaged said position indicator,
an indicator means, which is movable with said engaging means which is temporarily engaged with said position indicator, to visually indicate a selected/indicated data processing function, and
a supporting means to engage and support said indicator means.

18. The assisting apparatus set forth in claim 17 wherein
said position indicator is the shape of a pen, and
said engaging means is a hole into which a tip of said position indicator is inserted.

19. The assisting apparatus set forth in claim 17 or 18 wherein
said, supporting means of said indication part is the shape of a groove, and
said indicator means temporarily engages with said position indicator and is movable together with engaged said position indicator along said groove.

20. The assisting apparatus set forth in claim 17 or 18 wherein said indicator means of said indication part has one said engaging means at one end and another said engaging means at another end, and
said supporting means supports said indicator means in such a manner that said indicator means switches its indication status of selection/indication from one to another when said position indicator is engaged with one of said engaging means which was not engaged with said position indicator at the latest selection.

21. The assisting apparatus set forth in claim 17 or 18 wherein
said indicator means of said indication part is the shape of a bar,
said engaging means is provided at one end of said indicator means, and
said supporting means is provided at another end of said indicator means and supports said indicator means in a manner that said indicator means is rotatable around said supporting means.

22. An assisting apparatus which is used with a digitizer which includes a position indicator which is in the form of a pen and a coordinate detecting device which is in the form of a tablet, and which is separately constructed from said digitizer, wherein said digitizer can detect a rotational angle and a tilting angle of said position indicator with respect to its indicating position of a coordinate detecting surface of said coordinate detecting device, comprising
an indication part which is constructed in such a manner that it is placed within and onto a selection/indication area of said coordinate detecting surface of said coordinate detecting device and makes it possible the status of selections/indications of data processing functions to be visually observed, wherein said indication part comprises
an indication means which is comprised of a part having a spherical surface and has an engaging means, wherein said engaging means is in the form of a hole on said spherical surface and is a means into which said position indicator is inserted to engage said position indicator with said indication part, and said hole is also a means to visually indicate a rotational angle and a tilting angle of said position indicator, and
a supporting means which engages and supports said indication means in such a manner that said position indicator can be rotated and tilted to a desired position when said position indicator is inserted in said engaging means and that said supporting means maintains the same position of said indication means as that when said position indicator is pulled out from said engaging means.

23. The assisting apparatus set forth in claim 17, 18 or 22 wherein
said indication part includes a display part to which a physical expression is provided.

* * * * *